No. 877,813. PATENTED JAN. 28, 1908.
J. B. WALLER.
CUTTING TOOL.
APPLICATION FILED OCT. 11, 1907.
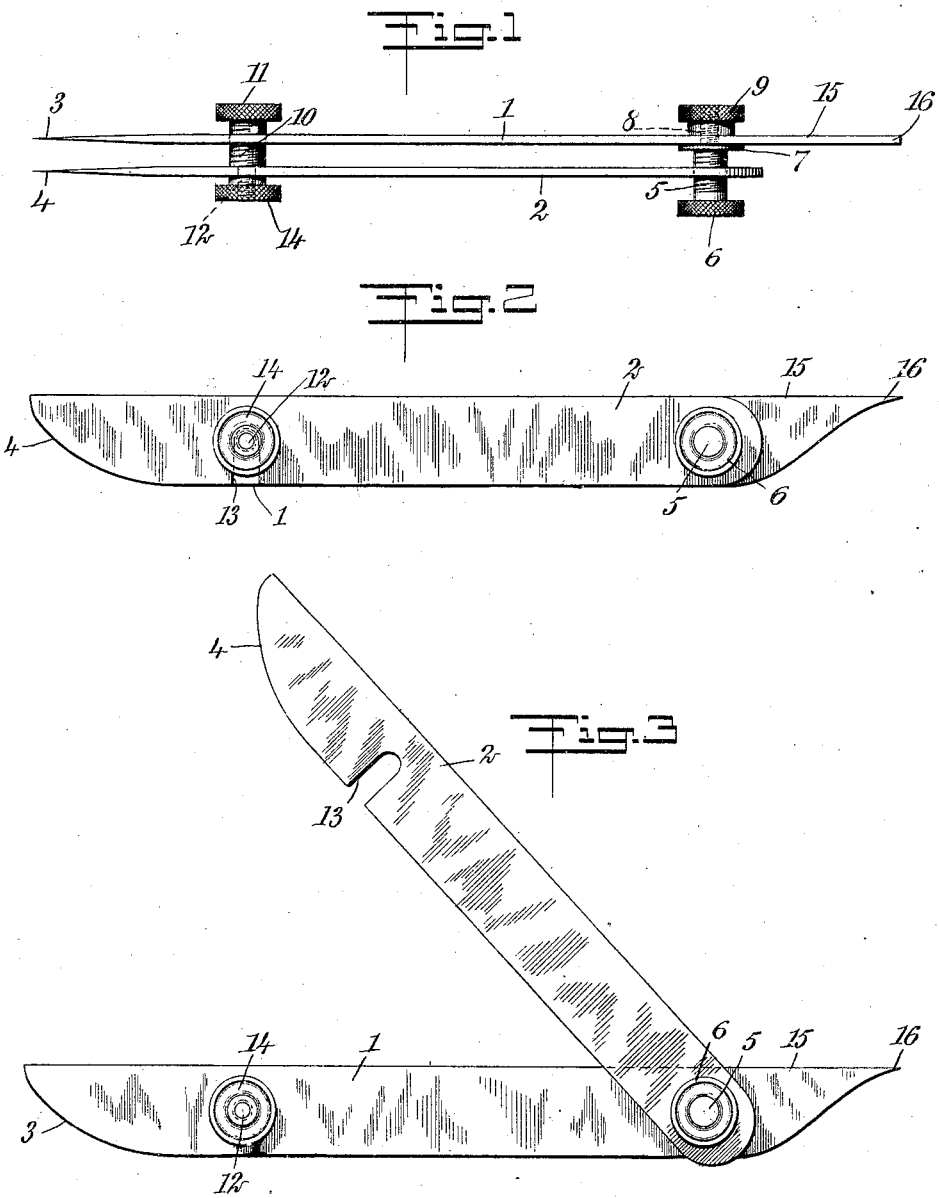
WITNESSES
INVENTOR
Joseph B. Waller
BY
ATTORNEYS

UNITED STATES PATENT OFFICE.

JOSEPH B. WALLER, OF KANSAS CITY, MISSOURI.

CUTTING-TOOL.

No. 877,813.  Specification of Letters Patent.  Patented Jan. 28, 1908.

Application filed October 11, 1907. Serial No. 396,935.

*To all whom it may concern:*

Be it known that I, JOSEPH B. WALLER, a citizen of the United States, and a resident of Kansas City, in the county of Jackson and State of Missouri, have invented a new and Improved Cutting-Tool, of which the following is a full, clear, and exact description.

This invention relates to cutting tools, and more particularly to cutting tools for fashioning slots, grooves, and the like, having parallel sides.

An object of the invention is to provide a tool for cutting slots, grooves and the like, having parallel sides and which is so adjustable that it can be used for fashioning grooves or slots of different widths.

A further object of the invention is to provide a cutting tool having blades which are adjustable relatively to one another and which can be separated to permit the sharpening of the cutting edges without difficulty.

A still further object of the invention is to provide a device of the class described having cutting blades which are mutually adjustable which can be separated for the purposes of sharpening or repair, and one of which is provided with a chisel extension for removing material from the groove or slot fashioned by means of the instrument.

The invention consists in the construction and combination of parts to be more fully described hereinafter and particularly pointed out in the claims.

Reference is to be had to the accompanying drawings forming a part of this specification, in which similar characters of reference indicate corresponding parts in all the views, and in which Figure 1 is a plan view of my invention; Fig. 2 is a side elevation; and Fig. 3 is a similar view showing the blades in different relative positions.

Before proceeding to a more detailed explanation of my invention it should be understood that in many of the arts and manufactures it is necessary to cut grooves, slots and the like in various kinds of material such as press board, wood, and the like.

My invention provides a cutting tool adapted to be manually operated for the fashioning of grooves or slots. The tool comprises blades having cutting edges and is provided with means for holding said blades relatively immovable, and at the same time for adjusting the distance between the blades so that the tool can be used for cutting slots or grooves of different widths. Furthermore, the construction and arrangement of the parts is such that the blades can be separated to permit the sharpening or repair of one or the other.

As an example of the use of my invention it should be noted that it is particularly useful in connection with folding-box presses used in the manufacture of boxes, cartons and the like. In machines of this kind grooves are cut in a sheet of press board or other material presenting a hard, calendered surface, glued on a brass or steel face-plate, which in turn is screwed to a plate of the box-cutting press. The press board, together with the face plate is known as a "make ready". In making a fold or in bending a corner of the box or package a groove on the "make ready" is used as a guide, opposite the edge of the corresponding rule which is located on the cutting or creasing die. Unless the slots or grooves in the "make ready" have absolutely parallel sides there is danger of cutting the paper which is being creased, or imperfectly folding or bending the same. Consequently, it is of importance to fashion the grooves or slots without the least variation in width; this can be done by means of my cutting tool as the blades of the latter are always held the same distance apart and are rigidly secured one to the other after they have been adjusted.

Referring more particularly to the drawings, the blades 1 and 2, which may be formed from any suitable material such as tool steel or the like, have similar cutting edges 3 and 4 at one end. At the end remote from the cutting edge 4 the blade 2 has a threaded opening therethrough in which is adjustably mounted a correspondingly threaded thumb-screw 5, having the usual head 6 by means of which it can be manually operated. At the end opposite to the head 6 the thumb-screw 5 has a lateral flange 7 constituting a shoulder which is adapted to abut against the adjacent face of the other blade 1. Extending from the flanged end of the thumb-screw is a threaded extension 8 of smaller diameter than the thumb-screw. The extension 8 projects through a suitable opening formed therefor in the blade 1 and serves to engage a correspondingly threaded thumb-nut 9 by means of which the blade 1 can be clamped against the shoulder of the thumb-screw 5. Near the cutting edge 3 of the blade 1 the latter is provided with a threaded opening in which is arranged a correspondingly threaded thumb-screw 10 having the usual head 11 by means of which it can be manually operated. At the end opposite the head 11 the thumb-screw 10 presents a shoulder adapted to abut against the adjacent face of the blade 2. Beyond the shoulder of the thumb-screw 11 the latter has a threaded extension 12 which projects through a suitable recess 13 formed therefor in the blade 2 and extending from the center to one edge of the latter. A thumb-nut 14 which is adapted to be screwed upon the threaded extension 12 serves to jam the blade 2 against the shoulder of the thumb-screw 11.

By means of the thumb-screws and the thumb-nuts the blades 1 and 2 can be rigidly secured one to the other. By screwing the thumb-screws in or out of the threaded openings provided therefor in the respective blades, the distance between the blades can be closely adjusted to permit the use of the tool in cutting grooves or slots of different widths. The recess 13 permits the swinging apart of the blades, as is shown most clearly in Fig. 3, when the thumb-screws have been loosened sufficiently to permit the release of the blades. When the blades are thus swung apart each of the cutting edges can be easily sharpened, or each blade otherwise repaired, without interference with the other blade.

At the end over the cutting edge 3 the blade 1 is provided with an extension 15 which is tapered to form a chisel edge 16; the latter can be conveniently employed in removing the material from the grooves or slots after the sides of the same have been cut by means of the edges of the blades.

It will be understood that the cutting tool of my invention can be usefully employed for purposes other than those specified; for instance, it is adapted to the cutting of strips of paper, leather, fabric or anything of like nature for use in certain arts and manufactures. In fact, it is possible to use this device for cutting strips of any kind when exact widths of the strips are necessary or preferable.

Having thus described my invention, I claim as new, and desire to secure by Letters Patent:—

1. A device of the class described, comprising blades having cutting edges, means for removably connecting said blades one to the other, and means for adjusting said blades with respect to one another, said second means serving to clamp said blades together.

2. A device of the class described, comprising blades having cutting edges, connecting means for pivotally securing said blades one to the other, and means for adjusting said blades transversely of their lengths and clamping the same together, one of said blades being removably secured to said connecting means.

3. A device of the class described, comprising blades having cutting edges, members pivotally connecting said blades, one of said blades being removably mounted upon one of said members, and means for adjusting said members to alter the distance between said blades, said means serving to clamp said blades together.

4. A device of the class described, comprising blades having cutting edges, and common means for adjusting the distance between said blades and rigidly securing said blades one to the other, said means, when released, permitting the pivotal movement of one of said blades with respect to the other transversely of their lengths.

5. A device of the class described, comprising blades having cutting edges, each of said blades being provided with a threaded opening, a thumb-screw arranged in said opening of each blade and adapted to abut against the other blade, and means for clamping said blades against said thumb-screws.

6. A device of the class described, comprising blades having cutting edges, each of said blades being provided with a threaded opening, a thumb-screw arranged in said opening of each blade and presenting a shoulder adapted to abut against the other blade, said blades having further openings, said thumb-screws having threaded extensions adapted to project through said further openings, and thumb-nuts upon said threaded extensions for clamping said blades against said shoulders.

7. A device of the class described, comprising blades having cutting edges, each of said blades being provided with a threaded opening, a thumb-screw arranged in said opening of each blade and presenting a shoulder adapted to abut against the other blade, said blades having further openings, said thumb-screws having threaded extensions adapted to project through said further openings, and thumb nuts upon said threaded extensions for clamping said blades against said shoulders, one of said further openings extending laterally to the edge of the blade to permit the lateral displacing of said blade from the corresponding thumb-screw.

8. A device of the class described, comprising blades having cutting edges, means for removably securing said blades together at a plurality of points, and means for clamping said blades in position relatively to one another, said clamping means being adapted to permit the mutual adjustment of said blades, one of said blades having an extension presenting a chisel edge.

In testimony whereof I have signed my name to this specification in the presence of two subscribing witnesses.

JOSEPH B. WALLER.

Witnesses:
 MALCOLM E. WALLER,
 JOHN M. WALLER.